(12) United States Patent
Gao et al.

(10) Patent No.: US 12,089,206 B2
(45) Date of Patent: Sep. 10, 2024

(54) TRANSMISSION METHOD FOR PHYSICAL UPLINK SHARED CHANNEL, TERMINAL, AND NETWORK DEVICE

(71) Applicant: DATANG MOBILE COMMUNICATIONS EQUIPMENT CO., LTD., Beijing (CN)

(72) Inventors: Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 498 days.

(21) Appl. No.: 17/431,130

(22) PCT Filed: Feb. 14, 2020

(86) PCT No.: PCT/CN2020/075203
§ 371 (c)(1),
(2) Date: Aug. 13, 2021

(87) PCT Pub. No.: WO2020/164568
PCT Pub. Date: Aug. 20, 2020

(65) Prior Publication Data
US 2022/0150924 A1    May 12, 2022

(30) Foreign Application Priority Data
Feb. 15, 2019   (CN) .......................... 201910118136.5

(51) Int. Cl.
H04W 72/1268    (2023.01)
H04L 1/08       (2006.01)
(Continued)

(52) U.S. Cl.
CPC .......... *H04W 72/1268* (2013.01); *H04L 1/08* (2013.01); *H04L 1/1642* (2013.01); *H04W 72/21* (2023.01)

(58) Field of Classification Search
CPC ....... H04L 1/08; H04L 1/1642; H04L 1/1819; H04L 1/1887; H04L 1/189; H04L 5/0044;
(Continued)

(56) References Cited

U.S. PATENT DOCUMENTS 9,876,627 B2 * 1/2018 Zhao ..................... H04L 5/1469
10,034,275 B2 * 7/2018 Kim ........................ H04L 1/189
(Continued)

FOREIGN PATENT DOCUMENTS

AU   2018236650 A1    2/2019
CN       103974422 A  * 8/2014 ........... H04B 7/2656
(Continued)

OTHER PUBLICATIONS

First Office Action and search report for the corresponding Chinese Patent Application No. 201910118136.5 issued on Mar. 2, 2023, and its English Translation provided by the Foreign Associate.
(Continued)

*Primary Examiner* — Eric Nowlin
(74) *Attorney, Agent, or Firm* — Ladas & Parry, LLP

(57) ABSTRACT

A transmission method for a physical uplink shared channel, a terminal and a network device are disclosed. The method on the terminal side includes: when at least one physical uplink shared channel (PUSCH) using a preset redundant version (RV) in a group of PUSCHs for repetition transmission is dropped or stopped, determining, based on the preset RV, an RV of at least one PUSCH subsequent to the PUSCH that is dropped or stopped in the group of PUSCHs for repetition transmission; sending a corresponding PUSCH according to the determined RV.

16 Claims, 6 Drawing Sheets

(51) Int. Cl.
*H04L 1/1607* (2023.01)
*H04W 72/21* (2023.01)
(58) Field of Classification Search
CPC ... H04L 5/0053; H04L 5/0057; H04L 5/0058; H04W 72/1268; H04W 72/21; H04W 72/56; H04W 72/569
See application file for complete search history.

(56) References Cited

U.S. PATENT DOCUMENTS

| | | | | |
|---|---|---|---|---|
| 10,581,577 | B2 * | 3/2020 | Li | H04L 5/0055 |
| 10,841,906 | B2 * | 11/2020 | Kim | H04L 5/0053 |
| 10,925,082 | B2 * | 2/2021 | Ye | H04L 5/1469 |
| 11,032,844 | B2 * | 6/2021 | Bhattad | H04L 5/0094 |
| 11,128,359 | B2 * | 9/2021 | Zhou | H04W 72/23 |
| 11,177,853 | B2 * | 11/2021 | Zhang | H04W 72/23 |
| 11,394,504 | B2 * | 7/2022 | Sun | H04L 1/08 |
| 11,483,819 | B2 * | 10/2022 | Zhao | H04W 72/0453 |
| 2015/0372798 | A1 * | 12/2015 | Zhao | H04W 28/18 370/280 |
| 2016/0381674 | A1 * | 12/2016 | Kim | H04L 1/1819 370/329 |
| 2017/0251464 | A1 * | 8/2017 | Mukherjee | H04W 74/0866 |
| 2018/0324793 | A1 * | 11/2018 | Kim | H04W 72/21 |
| 2018/0367282 | A1 * | 12/2018 | Li | H04W 72/1268 |
| 2018/0376498 | A1 * | 12/2018 | Bhattad | H04L 1/08 |
| 2019/0028143 | A1 * | 1/2019 | Zhang | H04L 5/0044 |
| 2019/0090230 | A1 * | 3/2019 | Mukherjee | H04W 80/06 |
| 2019/0207662 | A1 * | 7/2019 | Zhou | H04W 72/0446 |
| 2019/0357224 | A1 * | 11/2019 | Li | H04L 5/0055 |
| 2019/0393988 | A1 | 12/2019 | Bae et al. | |
| 2020/0021403 | A1 | 1/2020 | Zheng et al. | |
| 2020/0068608 | A1 * | 2/2020 | Ye | H04L 5/0044 |
| 2020/0128579 | A1 * | 4/2020 | Talarico | H04L 5/0055 |
| 2020/0170032 | A1 * | 5/2020 | Li | H04W 72/1268 |
| 2020/0186306 | A1 * | 6/2020 | Sun | H04L 1/08 |
| 2020/0382256 | A1 * | 12/2020 | Faxér | H04L 1/0026 |
| 2020/0383132 | A1 * | 12/2020 | Yang | H04W 74/0808 |
| 2020/0404650 | A1 * | 12/2020 | Chen | H04L 1/08 |
| 2021/0068084 | A1 * | 3/2021 | Zhao | H04W 72/0453 |
| 2021/0144702 | A1 * | 5/2021 | Zhao | H04W 72/21 |
| 2022/0053528 | A1 * | 2/2022 | Li | H04W 72/1268 |
| 2022/0095335 | A1 * | 3/2022 | Gao | H04L 5/0062 |
| 2022/0150924 | A1 * | 5/2022 | Gao | H04L 1/189 |
| 2023/0354323 | A1 * | 11/2023 | Gao | H04W 72/1268 |

FOREIGN PATENT DOCUMENTS

| | | | | |
|---|---|---|---|---|
| CN | 105850057 | A * | 8/2016 | H04B 7/26 |
| CN | 107801246 | A | 3/2018 | |
| CN | 108282274 | A1 | 7/2018 | |
| CN | 108631960 | A1 | 10/2018 | |
| CN | 105850057 | B * | 4/2019 | H04B 7/26 |
| CN | 110086526 | A * | 8/2019 | H04B 7/26 |
| CN | 111095837 | A * | 5/2020 | H04L 1/0041 |
| CN | 113055134 | A * | 6/2021 | H04L 1/1864 |
| CN | 108702776 | B * | 7/2021 | H04L 1/1864 |
| CN | 110086526 | B * | 3/2022 | H04B 7/26 |
| CN | 113055134 | B * | 8/2023 | H04L 1/1864 |
| EP | 2955966 | A1 * | 12/2015 | H04B 7/2656 |
| EP | 3079272 | A1 * | 10/2016 | H04B 7/26 |
| EP | 3079272 | A4 * | 8/2017 | H04B 7/26 |
| EP | 2955966 | B1 * | 1/2019 | H04B 7/2656 |
| EP | 3079272 | B1 * | 11/2019 | H04B 7/26 |
| EP | 3790334 | A1 * | 3/2021 | H04L 1/1864 |
| ES | 2764216 | T3 * | 6/2020 | H04B 7/26 |
| JP | 2016510560 | A * | 4/2016 | |
| JP | 2017506440 | A * | 3/2017 | |
| JP | 6193403 | B2 * | 9/2017 | H04B 7/2656 |
| JP | 6437554 | B2 * | 12/2018 | H04B 7/26 |
| JP | 7328994 | B2 * | 8/2023 | H04L 1/1864 |
| KR | 20150113187 | A * | 10/2015 | |
| KR | 20160068786 | A * | 6/2016 | |
| KR | 101700234 | B1 * | 1/2017 | |
| KR | 101763602 | B1 * | 8/2017 | |
| WO | WO-2014121687 | A1 * | 8/2014 | H04B 7/2656 |
| WO | WO-2015084048 | A1 * | 6/2015 | H04B 7/26 |
| WO | WO-2019213907 | A1 * | 11/2019 | H04L 1/1864 |

OTHER PUBLICATIONS

ZTE, "Enhancement for UL grant-free transmissions", R1-1810347, 3GPP TSG RAN WG1 Meeting #94bis, Chengdu, China, Oct. 8-12, 2018, all pages.
International Search Report from PCT/CN2020/075203, dated Apr. 30, 2020, with English translation from WIPO, all pages.
Written Opinion of the International Searching Authority from PCT/CN2020/075203, dated Apr. 30, 2020, with English translation from WIPO, all pages.
International Preliminary Report on Patentability from PCT/CN2020/075203, dated Aug. 10, 2021, with English translation from WIPO, all pages.
First Korean Office Action and search report for the corresponding Korean Patent Application No. 10-2021-7028011 issued on Jul. 18, 2023, and its English Translation provided by the Foreign Associate.
"Discussion on partially overlapped PUCCH and PUSCH for URLLC," 3GPP TSG RAN WG1 Meeting #93, R1-1806895, Busan, Korea, May 21-25, 2018, Agenda Item: 7.1.3.2.5, Source: Huawei, HiSilicon, all pages.
"Discussion on enhanced UL grant-free transmissions," 3GPP TSG RAN WG1 Meeting #94, R1-1808621, Gothenburg, Sweden, Aug. 20-24, 2018, Agenda Item: 7.2.6.3, Source: Panasonic, all pages.
Supplementary European Search Report for European Patent Application 20755126.8 issued on Feb. 23, 2022.
"URLLC aspects for overlapped UL transmissions," 3GPP TSG RAN WG1 Meeting #93, R1-1806928, Busan, Korea, May 21-25, 2018, Agenda item: 7.1.3.2.3, Source Nokia, Nokia Shanghai Bell.

* cited by examiner

TRANSMISSION METHOD FOR PHYSICAL UPLINK SHARED CHANNEL, TERMINAL, AND NETWORK DEVICE

CROSS-REFERENCE TO RELATED APPLICATIONS

The present application is a U.S. national phase application of a PCT Application No. PCT/CN2020/075203 filed on Feb. 14, 2020, which claims priority to Chinese patent application No. 201910118136.5 filed on Feb. 15, 2019, the disclosures of which are incorporated herein by reference in their entireties.

TECHNICAL FIELD

The present disclosure relates to the field of communication technologies, and in particular, to a transmission method for a physical uplink shared channel, a terminal and a network device.

BACKGROUND

SR (Scheduling Request) is carried on a PUCCH (Physical Uplink Control Channel) for transmission, and is transmitted on a configured PUCCH resource according to a configured period.

In NR R15, if MAC (Medium Access Control) determines before forming a PDU (Protocol Data Unit, the PDU is transmitted on a PUSCH (Physical Uplink Shared Channel)) that there is an SR to be transmitted, the MAC transmits the SR together with the data in the PUSCH through the BSR (Buffer Status Report), then there will no positive SR in a physical layer. Therefore, PUCCH transmission is not performed on a PUCCH resource corresponding to the SR.

If the MAC determines, when it begins to form or completes forming the PDU, that there is an SR, the SR cannot be packaged into the PDU through BSR. At this time, if the MAC layer determines that the resource of the SR overlaps with a PUSCH resource carrying the PDU, the MAC layer will not trigger positive SR transmission to the physical layer. Therefore, the PUCCH transmission is not performed on the PUCCH resource corresponding to the SR. Therefore, for a PUSCH carrying data (that is, a PUSCH with UL-SCH), there will be no overlap between a PUCCH carrying the SR and a PUSCH in the physical layer.

If the MAC layer determines that there is SR transmission, and the PUCCH resource carrying the SR does not overlap with the PUSCH, the MAC layer triggers the physical layer to transmit the positive SR. If the PUCCH carrying the positive SR overlaps with a PUCCH carrying other UCI (Uplink Control Information), for example, a PUCCH carrying HARQ-ACK (hybrid automatic repeat request acknowledgement)/CSI (channel state information), then according to a UCI multiplexing transmission rule, the SR may be transferred to other PUCCH resources for transmission, as shown in FIG. 1. The PUCCH may overlap with the PUSCH, thereby indirectly causing the SR to overlap with the PUSCH. Since the SR can no longer be packaged as a BSR into the data carried by the PUSCH, it is stipulated in the related art that the SR is dropped and not transmitted.

When the PUSCH does not carry a UL-SCH (Uplink Shared Channel), that is, there is no MAC PDU packing process, the SR cannot be transmitted on the PUSCH in the form of BSR. Since the PUSCH at this time is used to carry SP-CSI (semi-persistent CSI) or A-CSI (aperiodic CSI), considering that the importance of CSI is not as high as SR, it is stipulated to drop the PUSCH without UL-SCH, and transmit SR.

PUSCH can be configured to use repetition transmission, for example, repetition transmission in units of slots. Then one TB can be repeatedly transmitted through a plurality of PUSCHs, and each PUSCH for repetition transmission is transmitted in a different slot. Then a group of PUSCHs for repetition transmission can occupy a plurality of slots, and the PUSCH is transmitted on the same resource in each slot. The PUSCH in each slot carries the same TB (Transport Block) information, thereby achieving a purpose of improving an uplink transmission performance and an uplink coverage. As for RVs (Redundant Version) of the PUSCHs for repetition transmission, the RV corresponding to each PUSCH for repetition transmission is determined sequentially according to a predetermined RV sequence, starting from an initial RV which is notified by DCI (Downlink Control Information) or is predetermined. For example, the predetermined RV sequence is {0,2,3,1}, and the RV notified by the DCI for scheduling PUSCH transmission is RV=0, then an RV of a first PUSCH for repetition transmission is RV=0, and an RV of a second PUSCH for repetition transmission is RV=2, and so on.

In a 5G NR system, one terminal can have multiple service types at the same time, such as eMBB (enhanced mobile broadband) and URLLC (ultra-reliable, low-latency communication). In R16 URLLC, considering that URLLC has a higher priority than eMBB, if there is an overlap between the SR and PUSCH as described above, when the SR is a SR corresponding to URLLC, the SR cannot be dropped considering the high priority of URLLC; a possible way is to drop a PUSCH that overlaps with the SR. However, if the dropped PUSCH is the PUSCH in the repetition transmission that corresponds to RV=0, accurate and valid information may not be obtained from subsequent PUSCHs for repetition transmission even if they are combined.

In addition, when the PUCCHs configured with repetition transmission overlaps with a PUSCH, in order to ensure a transmission performance of the PUCCH, the PUSCH overlapping with the PUCCH of the repetition transmission is dropped. At this time, the above-mentioned problem may also exist.

There is no definite method as to how to ensure normal transmission of the PUSCH for repetition transmission when the PUSCH for repetition transmission overlaps with a PUCCH.

SUMMARY

Embodiments of the present disclosure provide a transmission method for a physical uplink shared channel, a terminal and a network device, to ensure normal transmission of a PUSCH for repetition transmission when the PUSCH for repetition transmission overlaps with a PUCCH.

To solve the above technical problem, an embodiment of the present disclosure provides the following technical solution: a transmission method for a physical uplink shared channel. The method is performed by a terminal and includes:

when at least one PUSCH using a preset redundant version (RV) in a group of PUSCHs for repetition transmission is dropped or stopped, determining, based on the preset RV, an RV of at least one PUSCH subsequent to the PUSCH that is dropped or stopped in the group of PUSCHs for repetition transmission;

sending a corresponding PUSCH according to the determined RV.

Optionally, the determining the RV of the at least one PUSCH subsequent to the PUSCH that is dropped or stopped in the group of PUSCHs for repetition transmission includes:

determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission.

Optionally, the determining the RV of the at least one PUSCH subsequent to the PUSCH that is dropped or stopped in the group of PUSCHs for repetition transmission includes:

determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence.

Optionally, the determining the RV of the at least one PUSCH subsequent to the PUSCH that is dropped or stopped in the group of PUSCHs for repetition transmission includes:

determining that an RV of a PUSCH subsequent to the PUSCH that is dropped or stopped in the group of PUSCHs for repetition transmission is the preset RV.

Optionally, that the at least one PUSCH is dropped or stopped includes at least one of the following:

when the at least one PUSCH overlaps with a PUCCH carrying a first type of UCI, the at least one PUSCH is dropped or stopped;

when the at least one PUSCH overlaps with a PUCCH, and a priority or importance of the PUCCH is higher than a priority or importance of the at least one PUSCH, the at least one PUSCH is dropped or stopped; or when the at least one PUSCH overlaps with a PUCCH with repetition transmission, the at least one PUSCH is dropped or stopped.

Optionally, the first type of UCI is a scheduling request (SR) or UCI corresponding to a first type of service or an SR corresponding to the first type of service; where the first type of service is: a service with high priority or importance, or an ultra-reliable and low-latency communication (URLLC) service.

Optionally, the PUSCH for repetition transmission corresponds to a second type of service; where the second type of service is: a service with low priority or importance, or an enhanced mobile broadband (eMBB) service, or a non-URLLC service.

Optionally, that the priority or importance of the PUCCH is higher than the priority or importance of the at least one PUSCH includes:

a priority or importance of a service type corresponding to the PUCCH is higher than a priority or importance of a service type corresponding to the at least one PUSCH.

Optionally, the service type or the priority or importance of the service type is determined from at least one of the following corresponding information:

downlink control information (DCI), radio network temporary identifier (RNTI), search space, control resource set (CORESET), beam, block error rate (BLER), channel quality indicator (CQI) table, modulation and coding scheme (MCS) table, priority flag, PUCCH resource or SR configuration index.

Optionally, the preset RV is a self-decoding RV.

Optionally, the group of PUSCHs for repetition transmission are a plurality of PUSCHs carrying repetition transmission of a same transport block (TB).

An embodiment of the present disclosure further provides a transmission method for physical uplink shared channel. The method is performed by a network device and includes:

when it is determined that at least one PUSCH using a preset redundant version (RV) in a group of PUSCHs for repetition transmission is dropped or stopped, determining, based on the preset RV, an RV of at least one PUSCH subsequent to the PUSCH that is dropped or stopped in the group of PUSCHs for repetition transmission;

receiving a corresponding PUSCH according to the determined RV.

Optionally, the determining the RV of the at least one PUSCH subsequent to the PUSCH that is dropped or stopped in the group of PUSCHs for repetition transmission includes:

determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission.

Optionally, the determining the RV of the at least one PUSCH subsequent to the PUSCH that is dropped or stopped in the group of PUSCHs for repetition transmission includes:

determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence.

Optionally, the determining the RV of the at least one PUSCH subsequent to the PUSCH that is dropped or stopped in the group of PUSCHs for repetition transmission includes:

determining that an RV of a PUSCH subsequent to the PUSCH that is dropped or stopped in the group of PUSCHs for repetition transmission is the preset RV.

Optionally, that the at least one PUSCH is dropped or stopped includes at least one of the following:

when the at least one PUSCH overlaps with a PUCCH carrying a first type of UCI, the at least one PUSCH is dropped or stopped;

when the at least one PUSCH overlaps with a PUCCH, and a priority or importance of the PUCCH is higher than a priority or importance of the at least one PUSCH, the at least one PUSCH is dropped or stopped; or when the at least one PUSCH overlaps with a PUCCH with repetition transmission, the at least one PUSCH is dropped or stopped.

Optionally, the first type of UCI is a scheduling request (SR) or UCI corresponding to a first type of service or an SR corresponding to the first type of service; where the first type of service is: a service with high priority or importance, or an ultra-reliable and low-latency communication (URLLC) service.

Optionally, the PUSCH for repetition transmission corresponds to a second type of service; where the second type of service is: a service with low priority or importance, or an enhanced mobile broadband (eMBB) service, or a non-URLLC service.

Optionally, that the priority or importance of the PUCCH is higher than the priority or importance of the at least one PUSCH includes: a priority or importance of a service type corresponding to the PUCCH is higher than a priority or importance of a service type corresponding to the at least one PUSCH.

Optionally, the service type or the priority or importance of the service type is determined from at least one of the following corresponding information: DCI, RNTI, search space, CORESET, beam, BLER, CQI table, MCS table, priority flag, PUCCH resource or SR configuration index.

Optionally, the preset RV is a self-decoding RV.

Optionally, the group of PUSCHs for repetition transmission are a plurality of PUSCHs carrying repetition transmission of a same TB.

An embodiment of the present disclosure further provides a terminal including: a processor, a transceiver, and a memory, where the memory stores a program executable by the processor, and the processor is configured to execute the program to implement the following step:

when at least one PUSCH using a preset RV in a group of PUSCHs for repetition transmission is dropped or stopped, determining, based on the preset RV, an RV of at least one PUSCH subsequent to the PUSCH that is dropped or stopped in the group of PUSCHs for repetition transmission;

the transceiver is configured to send a corresponding PUSCH according to the determined RV.

Optionally, the processor is specifically configured execute the program to implement the following steps:

determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission; or, determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence; or, determining that an RV of a PUSCH subsequent to the PUSCH that is dropped or stopped in the group of PUSCHs for repetition transmission is the preset RV.

Optionally, that the at least one PUSCH is dropped or stopped includes at least one of the following:

when the at least one PUSCH overlaps with a PUCCH carrying a first type of UCI, the at least one PUSCH is dropped or stopped;

when the at least one PUSCH overlaps with a PUCCH, and a priority or importance of the PUCCH is higher than a priority or importance of the PUSCH for repetition transmission, the at least one PUSCH is dropped or stopped; or when the at least one PUSCH overlaps with a PUCCH with repetition transmission, the at least one PUSCH is dropped or stopped.

Optionally, the first type of UCI is a scheduling request (SR) or UCI corresponding to a first type of service or an SR corresponding to the first type of service; where the first type of service is: a service with high priority or importance, or an ultra-reliable and low-latency communication (URLLC) service.

Optionally, the PUSCH for repetition transmission corresponds to a second type of service; where the second type of service is: a service with low priority or importance, or an enhanced mobile broadband (eMBB) service, or a non-URLLC service.

Optionally, that the priority or importance of the PUCCH is higher than the priority or importance of the at least one PUSCH includes: a priority or importance of a service type corresponding to the PUCCH is higher than a priority or importance of a service type corresponding to the at least one PUSCH.

Optionally, the service type or the priority or importance of the service type is determined from at least one of the following corresponding information: DCI, RNTI, search space, CORESET, beam, BLER, CQI table, MCS table, priority flag, PUCCH resource or SR configuration index.

Optionally, the preset RV is a self-decoding RV.

Optionally, the group of PUSCHs for repetition transmission are a plurality of PUSCHs carrying repetition transmission of a same TB.

An embodiment of the present disclosure further provides a terminal, including:

a processing module, configured to, when at least one PUSCH using a preset RV in a group of PUSCHs for repetition transmission is dropped or stopped, determine, based on the preset RV, an RV of at least one PUSCH subsequent to the PUSCH that is dropped or stopped in the group of PUSCHs for repetition transmission;

a transceiving module, configured to send a corresponding PUSCH according to the determined RV.

Optionally, the processing module is specifically configured to:

determine that an RV of a first PUSCH subsequent to the PUSCH that is dropped or stopped in the group of PUSCHs for repetition transmission is the preset RV; not change an RV of a PUSCH subsequent to the first PUSCH in the group of PUSCHs for repetition transmission; or, determine that an RV of a first PUSCH subsequent to the PUSCH that is dropped or stopped in the group of PUSCHs for repetition transmission is the preset RV, determine that an RV of a PUSCH, subsequent to the first PUSCH, in the group of PUSCHs for repetition transmission is an RV that is in a predetermined RV sequence and is selected sequentially from a position of the preset RV in the predetermined RV sequence; or, determine that an RV of a PUSCH subsequent to the PUSCH that is dropped or stopped in the group of PUSCHs for repetition transmission is the preset RV.

An embodiment of the present disclosure further provides a network device, comprising: a processor, a transceiver, and a memory, where the memory stores a program executable by the processor, and the processor is configured to execute the program to implement following step:

when it is determined that at least one PUSCH using a preset redundant version (RV) in a group of PUSCHs for repetition transmission is dropped or stopped, determining, based on the preset RV, an RV of at least one PUSCH subsequent to the PUSCH that is dropped or stopped in the group of PUSCHs for repetition transmission;

the transceiver is configured to receive a corresponding PUSCH according to the determined RV.

Optionally, the processor is specifically configured to execute the program to implement following steps:
- determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission; or,
- determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence; or,
- determining that an RV of a PUSCH subsequent to the PUSCH that is dropped or stopped in the group of PUSCHs for repetition transmission is the preset RV.

Optionally, that the at least one PUSCH is dropped or stopped includes at least one of the following:
- when the at least one PUSCH overlaps with a PUCCH carrying a first type of UCI, the at least one PUSCH is dropped or stopped;
- when the at least one PUSCH overlaps with a PUCCH, and a priority or importance of the PUCCH is higher than a priority or importance of the at least one PUSCH, the at least one PUSCH is dropped or stopped; or
- when the at least one PUSCH overlaps with a PUCCH with repetition transmission, the at least one PUSCH is dropped or stopped.

Optionally, the first type of UCI is a scheduling request (SR) or UCI corresponding to a first type of service or an SR corresponding to the first type of service; where the first type of service is: a service with high priority or importance, or a URLLC service.

Optionally, the PUSCH for repetition transmission corresponds to a second type of service; where the second type of service is: a service with low priority or importance, or an eMBB service, or a non-URLLC service.

Optionally, that the priority or importance of the PUCCH is higher than the priority or importance of the at least one PUSCH includes:
- a priority or importance of a service type corresponding to the PUCCH is higher than a priority or importance of a service type corresponding to the at least one PUSCH.

Optionally, the service type or the priority or importance of the service type is determined from at least one of the following corresponding information: DCI, RNTI, search space, CORESET, beam, BLER, CQI table, MCS table, priority flag, PUCCH resource or SR configuration index.

Optionally, the preset RV is a self-decoding RV.

Optionally, the group of PUSCHs for repetition transmission are a plurality of PUSCHs carrying repetition transmission of a same TB.

An embodiment of the present disclosure further provides a network device, including:
- a processing module, configured to, when it is determined that at least one PUSCH using a preset redundant version (RV) in a group of PUSCHs for repetition transmission is dropped or stopped, determine, based on the preset RV, an RV of at least one PUSCH subsequent to the PUSCH that is dropped or stopped in the group of PUSCHs for repetition transmission;
- a transceiving module, configured to receive a corresponding PUSCH according to the determined RV.

Optionally, the processing module is specifically configured to:
- determine that an RV of a first PUSCH subsequent to the PUSCH that is dropped or stopped in the group of PUSCHs for repetition transmission is the preset RV; not change an RV of a PUSCH subsequent to the first PUSCH in the group of PUSCHs for repetition transmission; or,
- determine that an RV of a first PUSCH subsequent to the PUSCH that is dropped or stopped in the group of PUSCHs for repetition transmission is the preset RV, determine that an RV of a PUSCH, subsequent to the first PUSCH, in the group of PUSCHs for repetition transmission is an RV that is in a predetermined RV sequence and is selected sequentially from a position of the preset RV in the predetermined RV sequence; or,
- determine that an RV of a PUSCH subsequent to the PUSCH that is dropped or stopped in the group of PUSCHs for repetition transmission is the preset RV.

An embodiment of the present disclosure further provides a computer storage medium including instructions, when the instructions are executed by a computer, the computer implements the above-mentioned methods.

The embodiments of the present disclosure have the following beneficial effects: in the above embodiments of the present disclosure, when at least one PUSCH using a first type of RV in a group of PUSCHs for repetition transmission is dropped or stopped, an RV of at least one PUSCH subsequent to the PUSCH that is dropped or stopped in the group of PUSCHs for repetition transmission is determined based on the first type of RV; a corresponding PUSCH is sent according to the determined RV. Therefore, normal transmission of the PUSCH for repetition transmission is ensured.

BRIEF DESCRIPTION OF THE DRAWINGS

In order to illustrate the technical solutions of the embodiments of the present disclosure in a clearer manner, the drawings desired for describing the embodiments of the present disclosure will be described hereinafter briefly. Obviously, the following drawings merely relate to some embodiments of the present disclosure, and based on these drawings, a person skilled in the art may obtain other drawings without any creative effort.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Figure 1:
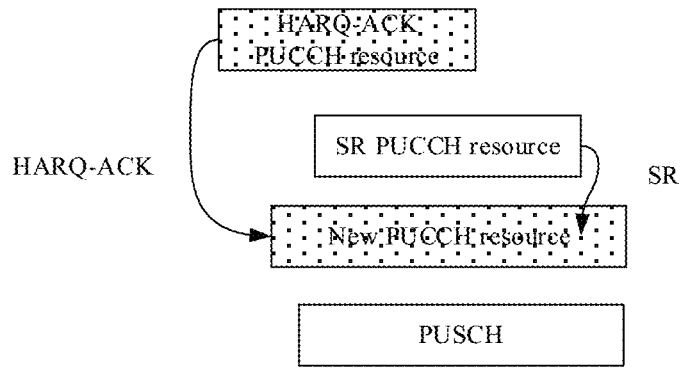
FIG. 1 is a schematic diagram showing that a PUCCH may overlap with a PUSCH.
Figure 2:
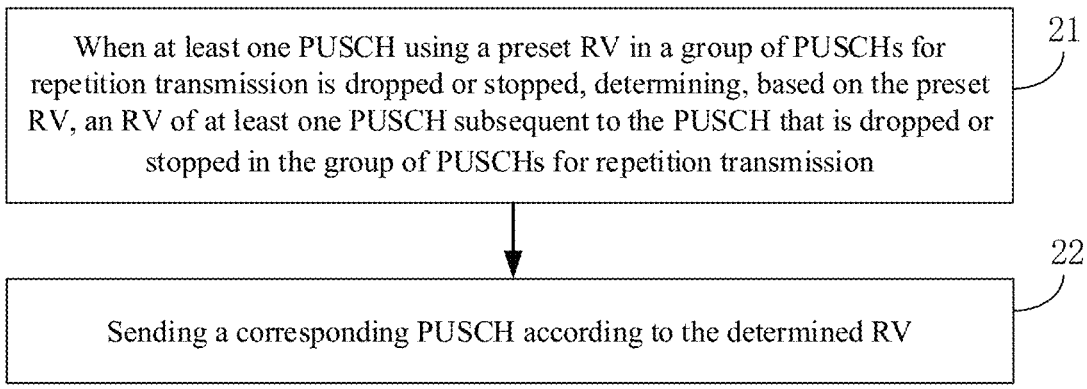
FIG. 2 is a flowchart of a transmission method for a physical uplink shared channel on a terminal side according to an embodiment of the disclosure.

As shown in FIG. 2, an embodiment of the present disclosure further provides a transmission method for a physical uplink shared channel. The method is performed by a terminal and includes a step 21 and a step 22.

Step 21, when at least one PUSCH using a preset redundant version (RV) in a group of PUSCHs for repetition transmission is dropped or stopped, determining, based on the preset RV, an RV of at least one PUSCH subsequent to a PUSCH that is dropped or stopped in the group of PUSCHs for repetition transmission; where the preset RV is a self-decoding RV, such as RV0; the group of PUSCHs for repetition transmission are a plurality of PUSCHs carrying repetition transmission of a same transport block (TB).

Step 22, sending a corresponding PUSCH according to the determined RV.

In this embodiment of the present disclosure, when at least one PUSCH using an RV of a first type in a group of PUSCHs for repetition transmission is dropped or stopped, an RV of at least one PUSCH subsequent to a PUSCH that is dropped or stopped in the group of PUSCHs for repetition transmission is determined based on the first type of RV; a corresponding PUSCH is sent according to the determined RV. Therefore, normal transmission of the PUSCH for repetition transmission is ensured. Further, when at least one PUSCH using the self-decoding RV in the group of PUSCHs for repetition transmission is dropped, an RV of a PUSCH for repetition transmission that is subsequent to the dropped PUSCH is changed to include an RV of a self-decoding version.

In a specific embodiment of the present disclosure, in the above step 21, determining an RV of at least one PUSCH subsequent to a PUSCH that is dropped or stopped in the group of PUSCHs for repetition transmission includes:

step 211, determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission.

That is, RVs of the PUSCHs subsequent to the first PUSCH in the group of PUSCHs for repetition transmission are RVs that are in a predetermined RV sequence and are selected sequentially onward from a position, in the predetermined RV sequence, of the RV of the first PUSCH in the group of PUSCHs for repetition transmission. In other words, only the RV of the first PUSCH subsequent to the PUSCH that is dropped or stopped is changed, and RVs of other PUSCHs are not changed.

For example, assuming that the predetermined RV sequence is {0,2,3,1}, if there are 4 PUSCHs in one group and the RV of the first PUSCH is RV0, then taking the RV0 as the starting point, it is determined sequentially onward according to the RV sequence that an RV of a second PUSCH is RV2, an RV of a third PUSCH is RV3, and an RV of a fourth PUSCH is RV1. Assuming that the first PUSCH is dropped because of overlapping with the PUCCH, since the RV of the first PUSCH is RV0, which is important and cannot be dropped, the original RV2 of the second PUSCH needs to be changed to RV0 during transmission of the second PUSCH, to ensure that there is RV0 transmission in the PUSCHs for repetition transmission. RVs of the other PUSCHs, that is, the third and fourth PUSCHs, are still the originally determined RVs, and are not changed.

In a specific embodiment of the present disclosure, in the above step 21, determining an RV of at least one PUSCH subsequent to a PUSCH that is dropped or stopped in the group of PUSCHs for repetition transmission may also include:

step 212, determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence.

For example, assuming the predetermined RV sequence is {0,2,3,1}, if there are 4 PUSCHs in one group and the RV of the first PUSCH is RV0, then taking the RV0 as the starting point, it is determined sequentially according to the RV sequence that an RV of a second PUSCH is RV2, an RV of a third PUSCH is RV3, and an RV of a fourth PUSCH is RV1. Assuming that the first PUSCH is dropped because of overlapping with the PUCCH, since the RV of the first PUSCH is RV0, which is important and cannot be dropped, the original RV2 of the second PUSCH needs to be changed to RV0 during transmission of the second PUSCH, to ensure that there is RV0 transmission in the PUSCHs for repetition transmission. Moreover, according to a position of a subsequent PUSCH with respect to the second PUSCH, an RV of each PUSCH is determined sequentially according to the predetermined RV sequence, where the RV0 of the second PUSCH is used as the starting point. That is, it is determined that the RV of the third PUSCH is RV2, and the RV of the fourth PUSCH is RV3. In this case, the RVs of the third and fourth PUSCHs are changed due to the change of the RV of the second PUSCH, and are no longer the originally determined RVs.

In a specific embodiment of the present disclosure, in the above step 21, determining an RV of at least one PUSCH subsequent to a PUSCH that is dropped or stopped in the group of PUSCHs for repetition transmission may further include:

step 213, determining that an RV of a PUSCH subsequent to a PUSCH that is dropped or stopped in the group of PUSCHs for repetition transmission is the preset RV.

For example, assuming that the predetermined RV sequence is {0,2,3,1}, if there are 4 PUSCHs in one group and the RV of the first PUSCH is RV0, then taking the RV0 as the starting point, it is determined sequentially according to the RV sequence that the RV of the second PUSCH is RV2, the RV of the third PUSCH is RV3, and the RV of the fourth PUSCH is RV1. Assuming that the first PUSCH is dropped because of overlapping with the PUCCH, since the RV of the first PUSCH is RV0, which is important and cannot be dropped, the original RV of a subsequent PUSCH needs to be changed to RV0 during subsequent PUSCH transmission, to ensure that there is RV0 transmission in the PUSCHs for repetition transmission. Therefore, it is determined that the RVs of the second, third and fourth PUSCHs are all RV0. In this case, the RVs of the second, third and fourth PUSCHs are changed because the first PUSCH using RV0 is dropped, and are no longer the originally determined RVs.

In the above embodiments of the present disclosure, that at least one PUSCH in the group of PUSCHs for repetition transmission is dropped or stopped includes at least one of the following case 1), case 2) or case 3).

Case 1) when the at least one PUSCH in the group of PUSCHs for repetition transmission overlaps with a PUCCH carrying a first type of uplink control information (UCI), the at least one PUSCH is dropped or stopped.

In one implementation, the first type of UCI is a scheduling request (SR) or UCI corresponding to a first type of service or an SR corresponding to the first type of service; where the first type of service is: a service with high priority or importance, or an ultra-reliable and low-latency communication (URLLC) service.

In another implementation, the PUSCH for repetition transmission corresponds to a second type of service; where the second type of service is: a service with low priority or importance, or an enhanced mobile broadband (eMBB) service, or a non-URLLC service.

In still another implementation, the first type of UCI is an SR or UCI corresponding to the first type of service or an SR corresponding to the first type of service, and the PUSCH for repetition transmission corresponds to the second type of service, where a priority or importance of the first type of service is higher than a priority or importance of the second type of service.

Where the foregoing service type or the priority or importance of the service type may be determined from at least one of the following corresponding information: downlink control information (DCI), radio network temporary identifier (RNTI), search space, control resource set (CORESET), beam, block error rate (BLER), channel quality indicator (CQI) table, modulation and coding scheme (MCS) table, priority flag, PUCCH resource or SR configuration index. That is to say, based on at least one of the above information, the service types or the priorities and importance of the service types corresponding to the first type of UCI and the PUSCH can be determined, so that it can be distinguished which of the first type of UCI and the PUSCH is more important. When it is determined that the priority of the first type of UCI is higher or the priorities of the first type of UCI and the PUSCH are equivalent, the above rules are followed; otherwise, the first type of UCI is dropped.

For example, when the first type of UCI corresponds to at least one of a first-type DCI format, a first-type DCI size, a first-type RNTI, a first-type search space, a first-type CORESET, a first-type beam, a first-type BLER (e.g., 10-5 or 10-6), a first-type CQI table (such as URLLC CQI table), a first-type MCS table (such as URLLC MCS table), a first-type priority flag, a first-type PUCCH resource (such as a resource with a small index or a resource with a specific index or a resource corresponding to a specific SR configuration index), or a first-type SR configuration index (for example, when a plurality of SR configurations are configured, an SR configuration with a less index is considered to correspond to URLLC), it means that that the first type of UCI has a high priority (the priority or importance of the service corresponding to the PUSCH is not considered at this time, in other words, the PUSCH is dropped or stopped irrespective of whether the PUSCH also corresponds to a service with high priority, that is, even if the priority of the PUSCH is equivalent to the first type of UCI), then the PUSCH is dropped or transmission of the PUSCH is stopped.

For another example, when the PUSCH corresponds to at least one of a second-type DCI format, a second-type DCI size, a second-type RNTI, a second-type search space, a second-type CORESET, a second-type beam, a second-type BLER (e.g., 10-2 or 10-1), a second-type CQI table (such as 64QAM/256QAM CQI table), a second-type MCS table (such as non-URLLC MCS table), a second-type priority flag, a second-type PUCCH resource (such as a resource with a large index or a resource with a specific index or a resource corresponding to a specific SR configuration index), or a second-type SR configuration index (for example, when a plurality of SR configurations are configured, a SR configuration with a greater index is considered to correspond to eMBB or non-URLLC), it means that that the PUSCH has a low priority (the priority or importance of the service corresponding to the PUCCH is not considered at this time, in other words, the PUSCH is dropped or stopped irrespective of whether the PUCCH also corresponds to a service having low priority, that is, even if the priority of the PUSCH is equivalent to the first type of UCI), then the PUSCH is dropped or transmission of the PUSCH is stopped.

For still another example, when the first type of UCI corresponds to at least one of a first-type DCI format, a first-type DCI size, a first-type RNTI, a first-type search space, a first-type CORESET, a first-type beam, a first-type BLER (e.g., 10-5 or 10-6), a first-type CQI table (such as URLLC CQI table), a first-type MCS table (such as URLLC MCS table), a first-type priority flag, a first-type PUCCH resource (such as a resource with a small index or a resource with a specific index or a resource corresponding to a specific SR configuration index), or a first-type SR configuration index (for example, when a plurality of SR configurations are configured, a SR configuration with a less index is considered to correspond to URLLC), and the PUSCH corresponds to at least one of a second-type DCI format, a second-type DCI size, a second-type RNTI, a second-type search space, a second-type CORESET, a second-type beam, a second-type BLER (e.g., 10-2 or 10-1), a second-type CQI table (such as 64QAM/256QAM CQI table), a second-type MCS table (such as non-URLLC MCS table), a second-type priority flag, a second-type PUCCH resource (such as a resource with a large index or a resource with a specific index or a resource corresponding to a specific SR configuration index), or a second-type SR configuration index (for example, when a plurality of SR configurations are configured, a SR configuration with a greater index is considered to correspond to eMBB or non-URLLC), it means that that the priority of the first type of UCI is higher than the priority of the PUSCH, then the PUSCH is dropped or transmission of the PUSCH is stopped.

It should be noted that at least one of the foregoing three implementations may exist.

Case 2) when the at least one PUSCH in a group of PUSCHs for repetition transmission overlaps with a PUCCH, and a priority or importance of the PUCCH is higher than a priority or importance of the at least one PUSCH, the at least one PUSCH is dropped or transmission of the PUSCH is stopped;

The UCI carried by the PUCCH may be at least one of SR or hybrid automatic repeat-request acknowledgement (HARQ-ACK) or channel state information (CSI).

That a priority or importance of the PUCCH is higher than a priority or importance of the at least one PUSCH includes: the priority or importance of the type of the service corresponding to the PUCCH is higher than the priority or importance of the type of the service corresponding to the at least one PUSCH; for example, the PUCCH corresponds to the URLLC service, the PUSCH corresponds to the eMBB service, or the PUCCH corresponds to URLLC service with priority 1, and the PUSCH corresponds to URLLC service with priority 2, where priority 1 is higher than priority 2. The priority or importance of the type of the service can be determined based on at least one of the following corresponding information: DCI format, DCI size, RNTI, search space, CORESET, beam, BLER, CQI table, MCS table, priority flag, PUCCH resource or SR configuration index. For example, according to at least one of the DCI format, DCI size, RNTI, search space, CORESET, beam, BLER, CQI table, MCS table, or priority flag corresponding to the PUCCH and PUSCH, it can be determined that the priority or importance of PUCCH is higher than the priority or importance of the PUSCH.

Case 3) when the at least one PUSCH in a group of PUSCHs for repetition transmission overlaps with a physical uplink control channel (PUCCH) for repetition transmission, the at least one PUSCH is dropped or transmission of the PUSCH is stopped.

A specific implementation of the foregoing embodiment will be described below with reference to specific PUSCH transmission.

Figure 3:
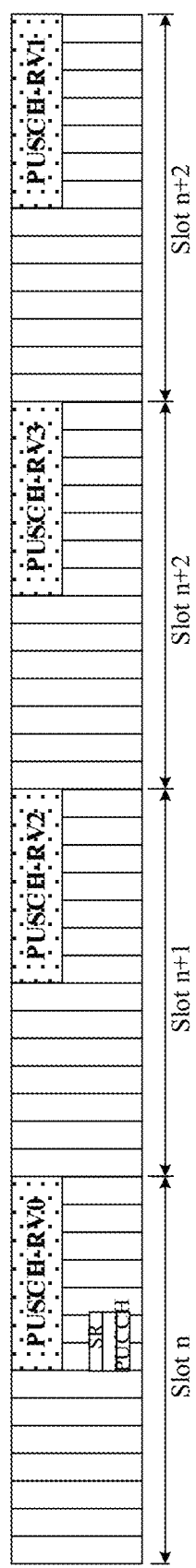
FIG. 3 is a schematic diagram of a configuration in which a PUSCH is repeatedly transmitted four times in an embodiment of the disclosure.

As shown in FIG. 3, assuming that it is configured the PUSCH is repeatedly transmitted 4 times, then a group of PUSCHs for repetition transmission contains 4 PUSCHs for transmission. Assuming that the predetermined RV sequence is {0,2,3,1}, and assuming that an RV indicator field in the DCI scheduling PUSCH for repetition transmission indicates RV0, then the first PUSCH is transmitted in slot n and its RV is RV0. Taking RV0 as the starting point, it can be determined sequentially according to the RV sequence that the RV of the second PUSCH is RV2, the RV of the third PUSCH is RV3, and the RV of the fourth PUSCH is RV1. Assuming that a PUCCH carrying URLLC SR overlaps with the first PUSCH in slot n, it is determined to drop the first PUSCH, that is, SR is transmitted through PUCCH in slot n. Because a PUSCH using a self-decoding RV0 in the group of PUSCHs for repetition transmission is dropped, in order to ensure that there is PUSCH transmission using RV0 in the group of PUSCHs for repetition transmission, then following processes are performed on the terminal side and network device side.

Terminal side: an RV of a subsequent PUSCH is determined in the following manner, and a corresponding PUSCH is sent using the corresponding RV.

Figure 4:
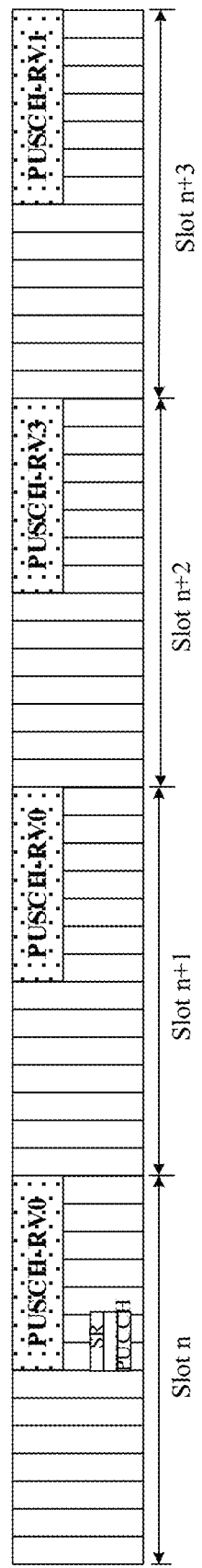
FIG. 4 is a schematic diagram of an implementation of determining an RV of at least one PUSCH subsequent to a PUSCH that is dropped or stopped in the group of PUSCHs for repetition transmission according to an embodiment of the present disclosure.

When the above-mentioned step 211 is adopted, as shown in FIG. 4: the RV of the second PUSCH is determined to be RV0, that is, the original RV2 of the second PUSCH is changed to RV0, to ensure that there is RV0 transmission in the PUSCHs for repetition transmission. The RVs of the third and fourth PUSCHs are still the original RVs, and are not changed.

Figure 5:
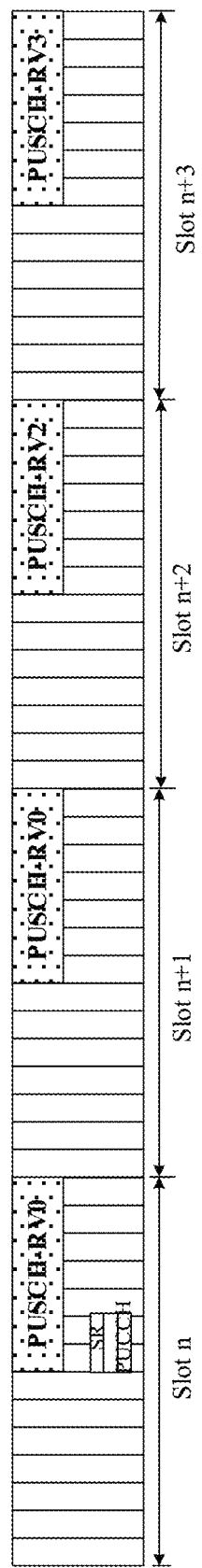
FIG. 5 is a schematic diagram of another implementation of determining an RV of at least one PUSCH subsequent to a PUSCH that is dropped or stopped in the group of PUSCHs for repetition transmission according to an embodiment of the present disclosure.

When the above-mentioned step 212 is adopted, as shown in FIG. 5: the RV of the second PUSCH is determined to be RV0, namely, the original RV2 of the second PUSCH is changed to RV0 to ensure that there is RV0 transmission in the PUSCHs for repetition transmission; moreover, according to a position of a subsequent PUSCH with respect to the second PUSCH, an RV of each PUSCH is determined sequentially according to the predetermined RV sequence, where the RV0 of the second PUSCH is used as the starting point, that is, it is determined that the RV of the third PUSCH is RV2 and the RV of the fourth PUSCH is RV3. At this time, the RVs of the third and fourth PUSCHs are changed due to the change of the RV of the second PUSCH, and are no longer the originally determined RVs.

Figure 6:
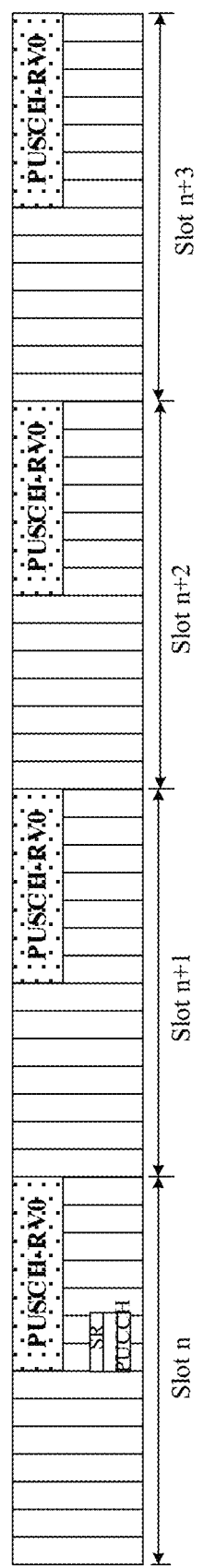
FIG. 6 is a schematic diagram of still another implementation of determining an RV of at least one PUSCH subsequent to a PUSCH that is dropped or stopped in the group of PUSCHs for repetition transmission according to an embodiment of the present disclosure.

When the above-mentioned step 213 is adopted, as shown in FIG. 6: it is determined that the RVs of the second, third and fourth PUSCHs are all RV0. At this time, the RVs of the second, third and fourth PUSCHs are changed because the first PUSCH is dropped, and are no longer the originally determined RVs.

Network device side: an RV of a subsequent PUSCH is determined in a manner corresponding to the terminal side, and a corresponding PUSCH is received using the corresponding RV;

It should be noted that in the above embodiment, only the overlap of URLLC SR PUCCH and PUSCH is taken as an example. But in the case that PUCCH carrying other UCI overlaps with the PUSCH, if the processing rule for overlapped transmission is to drop PUSCH, the above method is also applicable. In the case that at least one of the PUSCHs for repetition transmission is dropped due to any other reasons, the above method may be used. For example, when the PUCCH with repetition transmission overlaps with the PUSCH, the overlapped PUSCH is always dropped in the related art, and the PUSCH using RV0 may be dropped due to overlapping with the PUCCH with repetition transmission. In this case, it is necessary to modify the subsequent PUSCH for repetition transmission, which does not overlap with PUCCH, to transmit RV0. The above PUSCH can be the PUSCH of eMBB, then it is obvious that the priority and importance of URLLC SR is higher than that of eMBB. Or, the above PUSCH may also be URLLC PUSCH; although both the PUSCH and the SR belong to the URLLC service, if the SR is dropped, the latency of SR will be too large, considering that the PUSCH for repetition transmission occupies a longer time domain duration. At this time, one or more of the PUSCHs for repetition transmission will also be dropped due to overlap of the SR and the PUSCH for repetition transmission. The foregoing description only takes repetitive PUSCH transmission in units of slots as an example. If there may be a plurality of PUSCHs in one slot that correspond to the same TB transmission, that is, there is repetition transmission in one slot, the above method is also applicable. The difference is that one PUCCH carrying SR may overlap with a plurality of PUSCHs for repetition transmission, for example, one PUCCH overlaps with the first and second PUSCHs at the same time, then two PUSCHs need to be dropped, the third PUSCH is the first channel subsequent to the dropped PUSCH, and the RV of the third PUSCH is determined to be RV0. The foregoing dropping PUSCH may also be partially dropping, that is, to cancel or terminate one PUSCH transmission, which may be the case that the transmission stops after the PUSCH has been partially transmitted. The above PUSCH is not limited to the PUSCH scheduled by DCI or the scheduling-free PUSCH. If it is a scheduling-free PUSCH, its RV sequence may be different from the above sequence, for example, its RV sequence may be {0,0,0,0}, {0,3,0,3}, etc.

In the above embodiments of the present disclosure, when at least one PUSCH using the self-decoding RV in the group of PUSCHs for repetition transmission is dropped, an RV of a PUSCH for repetition transmission subsequent to the dropped PUSCH is changed to include an RV of a self-decoding version, thereby ensuring the reliability of the repetitive PUSCH transmission.

Figure 7:
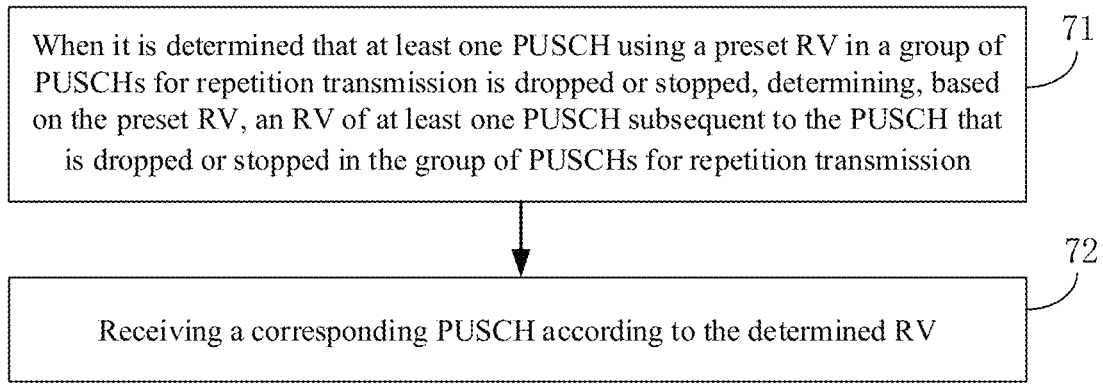
FIG. 7 is a flowchart of a transmission method for a physical uplink shared channel on a network device side according to an embodiment of the disclosure.

As shown in FIG. 7, a transmission method for a physical uplink shared channel is performed by a network device and includes a step 71 and a step 72.

Step 71, when it is determined that at least one PUSCH using a preset redundant version (RV) in a group of PUSCHs for repetition transmission is dropped or stopped, determining, based on the preset RV, an RV of at least one PUSCH subsequent to a PUSCH that is dropped or stopped in the group of PUSCHs for repetition transmission; where the preset RV is a self-decoding RV; the group of PUSCHs for repetition transmission are a plurality of PUSCHs carrying repetition transmission of a same TB.

Step 72, receiving a corresponding PUSCH according to the determined RV.

In another embodiment, in the step 71, determining an RV of at least one PUSCH subsequent to a PUSCH that is dropped or stopped in the group of PUSCHs for repetition transmission may include: a step 711, determining that an RV of a first PUSCH subsequent to the PUSCH that is dropped or stopped in the group of PUSCHs for repetition transmission is the preset RV; not changing an RV of a PUSCH subsequent to the first PUSCH in the group of PUSCHs for repetition transmission.

In another embodiment, in the step 71, determining an RV of at least one PUSCH subsequent to a PUSCH that is dropped or stopped in the group of PUSCHs for repetition transmission includes: a step 712, determining that an RV of a first PUSCH subsequent to the PUSCH that is dropped or stopped in the group of PUSCHs for repetition transmission is the preset RV, determining that an RV of a PUSCH, subsequent to the first PUSCH, in the group of PUSCHs for repetition transmission is an RV that is in a predetermined RV sequence and is selected sequentially from a position of the preset RV in the predetermined RV sequence.

In another embodiment, in the step 71, determining an RV of at least one PUSCH subsequent to a PUSCH that is dropped or stopped in the group of PUSCHs for repetition transmission includes: a step 713, determining that an RV of a PUSCH subsequent to a PUSCH that is dropped or stopped in the group of PUSCHs for repetition transmission is the preset RV.

In the above embodiment, that the at least one PUSCH is dropped or stopped includes at least one of following case 1), case 2) or case 3).

Case 1) when the at least one PUSCH overlaps with a PUCCH carrying a first type of UCI, the at least one PUSCH is dropped or stopped.

In one implementation, the first type of UCI is a scheduling request (SR) or UCI corresponding to a first type of service or an SR corresponding to the first type of service; where the first type of service is: a service with high priority or importance, or an ultra-reliable and low-latency communication (URLLC) service.

In another implementation, the PUSCH for repetition transmission corresponds to a second type of service; where the second type of service is: a service with low priority or importance, or an enhanced mobile broadband (eMBB) service, or a non-URLLC service.

In still another implementation, the first type of UCI is an SR or UCI corresponding to the first type of service or an SR corresponding to the first type of service, and the PUSCH for repetition transmission corresponds to the second type of service, where a priority or importance of the first type of service is higher than a priority or importance of the second type of service.

The service type or the priority or importance of the service type may be determined from at least one of the following corresponding information: DCI, RNTI, search space, CORESET, beam, BLER, CQI table, MCS table, priority flag, PUCCH resource or SR configuration index. That is to say, based on at least one of the above information, the service type or the priorities and importance of the service type corresponding to the first type of UCI and PUSCH can be determined, so that it can be distinguished which of the first type of UCI and the PUSCH is more important. When it is determined that the priority of the first type of UCI is higher or the priorities of the first type of UCI and the PUSCH are equivalent, the above rules are followed; otherwise, the first type of UCI is dropped.

The foregoing three implementations can be implemented independently or in any combination.

Case 2) when the at least one PUSCH in a group of PUSCHs for repetition transmission overlaps with a PUCCH, and a priority or importance of the PUCCH is higher than a priority or importance of the PUSCH for repetition transmission, the at least one PUSCH is dropped or stopped;

The UCI carried by the PUCCH may be at least one of scheduling request (SR) or hybrid automatic repeat-request acknowledgement (HARQ-ACK) or channel state information (CSI).

That the priority or importance of the PUCCH is higher than the priority or importance of the at least one PUSCH includes: a priority or importance of a service type corresponding to the PUCCH is higher than a priority or importance of a service type corresponding to the at least one PUSCH.

Case 3) when the at least one PUSCH in a group of PUSCHs for repetition transmission overlaps with a physical uplink control channel (PUCCH) for repetition transmission, the at least one PUSCH is dropped or stopped.

In this embodiment of the present disclosure, when at least one PUSCH using the self-decoding RV in the group of PUSCHs for repetition transmission is dropped, an RV of a PUSCH for repetition transmission subsequent to the dropped PUSCH is changed to include an RV of a self-decoding version, thereby ensuring the reliability of the repetitive PUSCH transmission.

Figure 8:
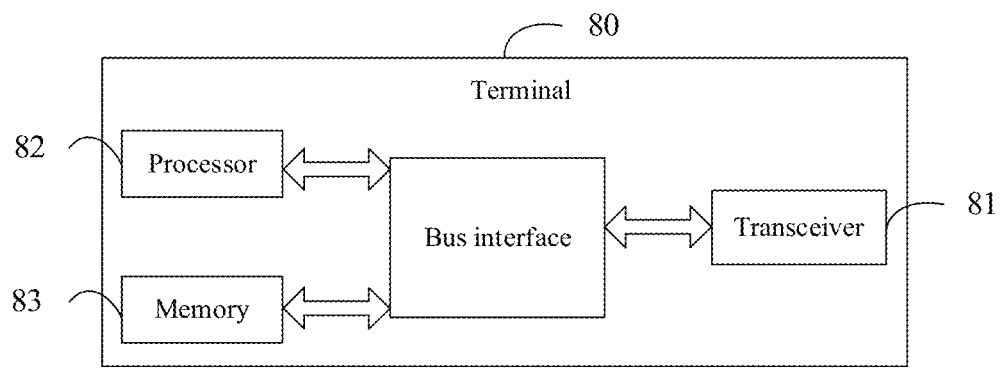
FIG. 8 is a schematic structural diagram of a terminal according to an embodiment of the disclosure.

As shown in FIG. 8, an embodiment of the present disclosure further provides a terminal 80, including: a processor 82, a transceiver 81, and a memory 83, where the memory 83 stores a program executable by the processor 82, when the processor 82 executes the program, the following step is implemented: when at least one PUSCH using a preset redundant version (RV) in a group of PUSCHs for repetition transmission is dropped or stopped, determining, based on the preset RV, an RV of at least one PUSCH subsequent to a PUSCH that is dropped or stopped in the group of PUSCHs for repetition transmission; the transceiver is configured to send a corresponding PUSCH according to the determined RV.

The processor 82 is specifically configured to:
determine that an RV of a first PUSCH subsequent to the PUSCH that is dropped or stopped in the group of PUSCHs for repetition transmission is the preset RV;

not change an RV of a PUSCH subsequent to the first PUSCH in the group of PUSCHs for repetition transmission; or, determine that an RV of a first PUSCH subsequent to the PUSCH that is dropped or stopped in the group of PUSCHs for repetition transmission is the preset RV, determine that an RV of a PUSCH subsequent to the first PUSCH in the group of PUSCHs for repetition transmission is an RV that is in a predetermined RV sequence and is selected sequentially from a position of the preset RV in the predetermined RV sequence; or, determine that an RV of a PUSCH subsequent to the PUSCH that is dropped or stopped in the group of PUSCHs for repetition transmission is the preset RV.

That the at least one PUSCH is dropped or stopped includes at least one of the following:

when the at least one PUSCH overlaps with a PUCCH carrying a first type of UCI, the at least one PUSCH is dropped or stopped;

when the at least one PUSCH overlaps with a PUCCH, and a priority or importance of the PUCCH is higher than a priority or importance of the PUSCH for repetition transmission, the at least one PUSCH is dropped or stopped; or when the at least one PUSCH overlaps with a PUCCH with repetition transmission, the at least one PUSCH is dropped or stopped.

The first type of UCI is a scheduling request (SR) or UCI corresponding to a first type of service or an SR corresponding to the first type of service; where the first type of service is: a service with high priority or importance, or a URLLC service.

The PUSCH for repetition transmission corresponds to a second type of service; where the second type of service is: a service with low priority or importance, or an eMBB service, or a non-URLLC service.

That the priority or importance of the PUCCH is higher than the priority or importance of the at least one PUSCH includes: a priority or importance of a service type corresponding to the PUCCH is higher than a priority or importance of a service type corresponding to the at least one PUSCH.

The service type or the priority or importance of the service type is determined from at least one of the following corresponding information: DCI, RNTI, search space, CORESET, beam, BLER, CQI table, MCS table, priority flag, PUCCH resource or SR configuration index.

The preset RV is a self-decoding RV.

The group of PUSCHs for repetition transmission are a plurality of PUSCHs carrying repetition transmission of a same TB.

It should be noted that the terminal is a terminal corresponding to the method shown in FIG. 2, and all implementations in the foregoing method embodiment are applicable to the embodiment of the terminal, and can achieve the same technical effect. The transceiver 81 and the processor 82, as well as the transceiver 81 and the memory 83, can be connected through a bus interface. The functions of the transceiver 81 can be implemented by the processor 82, and the functions of the processor 82 can also be implemented by the transceiver 81.

An embodiment of the present disclosure further provides a terminal, including:

a processing module, configured to, when at least one PUSCH using a preset redundant version (RV) in a group of PUSCHs for repetition transmission is dropped or stopped, determine, based on the preset RV, an RV of at least one PUSCH subsequent to a PUSCH that is dropped or stopped in the group of PUSCHs for repetition transmission;

a transceiving module, configured to send a corresponding PUSCH according to the determined RV.

The processing module is specifically configured to:

determine that an RV of a first PUSCH subsequent to the PUSCH that is dropped or stopped in the group of PUSCHs for repetition transmission is the preset RV; not change an RV of a PUSCH subsequent to the first PUSCH in the group of PUSCHs for repetition transmission; or, determine that an RV of a first PUSCH subsequent to the PUSCH that is dropped or stopped in the group of PUSCHs for repetition transmission is the preset RV, determine that an RV of a PUSCH, subsequent to the first PUSCH, in the group of PUSCHs for repetition transmission is an RV that is in a predetermined RV sequence and is selected sequentially from a position of the preset RV in the predetermined RV sequence; or, determine that an RV of a PUSCH subsequent to a PUSCH that is dropped or stopped in the group of PUSCHs for repetition transmission is the preset RV.

That the at least one PUSCH is dropped or stopped includes at least one of the following:

when the at least one PUSCH overlaps with a PUCCH carrying a first type of UCI, the at least one PUSCH is dropped or stopped;

when the at least one PUSCH overlaps with a PUCCH, and a priority or importance of the PUCCH is higher than that of the PUSCH for repetition transmission, the at least one PUSCH is dropped or stopped; or when the at least one PUSCH overlaps with a PUCCH with repetition transmission, the at least one PUSCH is dropped or stopped;

The first type of UCI is a scheduling request (SR) or UCI corresponding to a first type of service or an SR corresponding to the first type of service; where the first type of service is: a service with high priority or importance, or an ultra-reliable and low-latency communication (URLLC) service.

The PUSCH for repetition transmission corresponds to a second type of service; where the second type of service is: a service with low priority or importance, or an eMBB service, or a non-URLLC service.

That the priority or importance of the PUCCH is higher than the priority or importance of the at least one PUSCH includes: a priority or importance of a service type corresponding to the PUCCH is higher than a priority or importance of a service type corresponding to the at least one PUSCH.

The service type or the priority or importance of the service type is determined from at least one of the following corresponding information: DCI, RNTI, search space, CORESET, beam, BLER, CQI table, MCS table, priority flag, PUCCH resource or SR configuration index.

The preset RV is a self-decoding RV.

The group of PUSCHs for repetition transmission are a plurality of PUSCHs carrying repetition transmission of a same TB. It should be noted that the terminal is a terminal corresponding to the method shown in FIG. 2, and all implementations in the foregoing method embodiment are applicable to the embodiment of the terminal, and can achieve the same technical effect.

Figure 9:
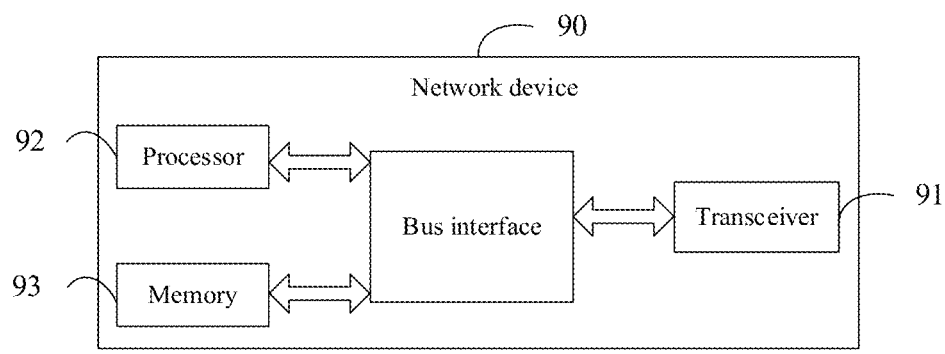
FIG. 9 is a schematic structural diagram of a network device according to an embodiment of the present disclosure.

As shown in FIG. 9, an embodiment of the present disclosure further provides a network device 90, including: a processor 92, a transceiver 91, and a memory 93, where the memory 93 stores a program executable by the processor 92, when the processor 92 executes the program, the following step is implemented: when it is determined that at least one PUSCH using a preset redundant version (RV) in a group of physical uplink shared channels PUSCHs for repetition transmission is dropped or stopped, determining, based on the preset RV, an RV of at least one PUSCH subsequent to a PUSCH that is dropped or stopped in the group of PUSCHs for repetition transmission; the transceiver 91 is configured to receive a corresponding PUSCH according to the determined RV.

The processor 92 is specifically configured to:
determine that an RV of a first PUSCH subsequent to the PUSCH that is dropped or stopped in the group of PUSCHs for repetition transmission is the preset RV; not change an RV of a PUSCH subsequent to the first PUSCH in the group of PUSCHs for repetition transmission; or,
determine that an RV of a first PUSCH subsequent to the PUSCH that is dropped or stopped in the group of PUSCHs for repetition transmission is the preset RV, determine that an RV of a PUSCH, subsequent to the first PUSCH, in the group of PUSCHs for repetition transmission is an RV that is in a predetermined RV sequence and is selected sequentially from a position of the preset RV in the predetermined RV sequence, or,
determine that an RV of a PUSCH subsequent to a PUSCH that is dropped or stopped in the group of PUSCHs for repetition transmission is the preset RV.

That the at least one PUSCH is dropped or stopped includes at least one of the following:
when the at least one PUSCH overlaps with a PUCCH carrying a first type of UCI, the at least one PUSCH is dropped or stopped;
when the at least one PUSCH overlaps with a PUCCH, and a priority or importance of the PUCCH is higher than a priority or importance of the at least one PUSCH, the at least one PUSCH is dropped or stopped; or
when the at least one PUSCH overlaps with a PUCCH with repetition transmission, the at least one PUSCH is dropped or stopped;

The first type of UCI is a scheduling request (SR) or UCI corresponding to a first type of service or an SR corresponding to the first type of service; where the first type of service is: a service with high priority or importance, or an ultra-reliable and low-latency communication (URLLC) service.

The PUSCH for repetition transmission corresponds to a second type of service; where the second type of service is: a service with low priority or importance, or an eMBB service, or a non-URLLC service.

That the priority or importance of the PUCCH is higher than the priority or importance of the at least one PUSCH includes: a priority or importance of a service type corresponding to the PUCCH is higher than a priority or importance of a service type corresponding to the at least one PUSCH.

The service type or the priority or importance of the service type is determined from at least one of the following corresponding information: DCI, RNTI, search space, CORESET, beam, BLER, CQI table, MCS table, priority flag, PUCCH resource or SR configuration index.

The preset RV is a self-decoding RV.

The group of PUSCHs for repetition transmission are a plurality of PUSCHs carrying repetition transmission of a same TB.

It should be noted that the terminal is a terminal corresponding to the method shown in FIG. 2, and all implementations in the foregoing method embodiment are applicable to the embodiment of the terminal, and can achieve the same technical effect. The transceiver 91 and the processor 92, as well as the transceiver 91 and the memory 93, can be connected through a bus interface. The functions of the transceiver 91 can be implemented by the processor 92, and the functions of the processor 92 can also be implemented by the transceiver 91.

An embodiment of the present disclosure further provides a network device, including:
a processing module, configured to, when it is determined that at least one PUSCH using a preset redundant version (RV) in a group of PUSCHs for repetition transmission is dropped or stopped, determine, based on the preset RV, an RV of at least one PUSCH subsequent to a PUSCH that is dropped or stopped in the group of PUSCHs for repetition transmission;
a transceiving module, configured to receive a corresponding PUSCH according to the determined RV.

The processing module is specifically configured to:
determine that an RV of a first PUSCH subsequent to the PUSCH that is dropped or stopped in the group of PUSCHs for repetition transmission is the preset RV; not change an RV of a PUSCH subsequent to the first PUSCH in the group of PUSCHs for repetition transmission; or,
determine that an RV of a first PUSCH subsequent to the PUSCH that is dropped or stopped in the group of PUSCHs for repetition transmission is the preset RV, determine that an RV of a PUSCH, subsequent to the first PUSCH, in the group of PUSCHs for repetition transmission is an RV that is in a predetermined RV sequence and is selected sequentially from a position of the preset RV in the predetermined RV sequence; or,
determine that an RV of a PUSCH subsequent to a PUSCH that is dropped or stopped in the group of PUSCHs for repetition transmission is the preset RV.

That the at least one PUSCH is dropped or stopped includes at least one of the following:
when the at least one PUSCH overlaps with a PUCCH carrying a first type of UCI, the at least one PUSCH is dropped or stopped;
when the at least one PUSCH overlaps with a PUCCH, and a priority or importance of the PUCCH is higher than a priority or importance of the at least one PUSCH, the at least one PUSCH is dropped or stopped; or
when the at least one PUSCH overlaps with a PUCCH with repetition transmission, the at least one PUSCH is dropped or stopped;

The first type of UCI is a scheduling request (SR) or UCI corresponding to a first type of service or an SR corresponding to the first type of service; where the first type of service is: a service with high priority or importance, or an ultra-reliable and low-latency communication (URLLC) service.

The PUSCH for repetition transmission corresponds to a second type of service; where the second type of service is: a service with low priority or importance, or an eMBB service, or a non-URLLC service.

That the priority or importance of the PUCCH is higher than the priority or importance of the at least one PUSCH includes: a priority or importance of a service type corresponding to the PUCCH is higher than a priority or importance of a service type corresponding to the at least one PUSCH.

The service type or the priority or importance of the service type is determined from at least one of the following corresponding information: DCI, RNTI, search space, CORESET, beam, BLER, CQI table, MCS table, priority flag, PUCCH resource or SR configuration index.

The preset RV is a self-decoding RV.

The group of PUSCHs for repetition transmission are a plurality of PUSCHs carrying repetition transmission of a same TB. It should be noted that the network device is a network device corresponding to the method shown in FIG. 7, and all implementations in the foregoing method embodiment are applicable to the embodiment of the network device, and can achieve the same technical effect.

An embodiment of the present disclosure further provides a computer storage medium, including instructions, when the instructions are executed by a computer, the computer implements the method as shown in FIG. 2 or the method as shown in FIG. 7. The methods as shown in FIG. 3 to FIG. 6 are also applicable to this embodiment, and can achieve the same technical effects.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, a read-only memory (ROM), a random access memory (RAM), a magnetic disk, or an optical disc.

In addition, it should be noted that in the apparatus and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

It should be appreciated that, the embodiments of the present disclosure may be implemented by hardware, software, firmware, middleware, microcode or a combination thereof. For hardware implementation, the processing units may be implemented in one or more Application Specific Integrated Circuits (ASIC), a Digital Signal Processor (DSP), a DSP Device (DSPD), a Programmable Logic Device (PLD), a Field-Programmable Gate Array (FPGA), a general-purpose processor, a controller, a microcontroller, a microprocessor, another electronic unit for performing the functions described in this application, or a combination thereof.

For a software implementation, the techniques in some embodiments of the present disclosure may be implemented by modules (for example, processes or functions) performing the functions described in some embodiments of the present disclosure. The software code may be stored in the memory and executed by the processor. The memory may be implemented inside or outside the processor.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A transmission method for a physical uplink shared channel, performed by a terminal, comprising:
   in response to a physical uplink shared channel (PUSCH) using a preset redundant version (RV) in a group of PUSCHs for repetition transmission being dropped or stopped, determining, based on the preset RV, an RV of at least one PUSCH subsequent to the PUSCH that is dropped or stopped in the group of PUSCHs for repetition transmission;
   sending a corresponding PUSCH according to the determined RV;
   wherein the determining, based on the preset RV, the RV of the at least one PUSCH subsequent to the PUSCH that is dropped or stopped in the group of PUSCHs for repetition transmission comprises:
   determining that a first PUSCH subsequent to the PUSCH that is dropped or stopped in the group of PUSCHs for repetition transmission uses the preset RV, and not changing an RV of a PUSCH subsequent to the first PUSCH subsequent to the PUSCH that is dropped or stopped in the group of PUSCHs for repetition transmission;
   or,
   determining that a first PUSCH subsequent to the PUSCH that is dropped or stopped in the group of PUSCHs for repetition transmission uses the preset RV, and determining that a PUSCH, subsequent to the first PUSCH subsequent to the PUSCH that is dropped or stopped, in the group of PUSCHs for repetition transmission uses an RV that is in a predetermined RV sequence and is selected sequentially from a position of the preset RV in the predetermined RV sequence;
   or,
   determining that all PUSCHs subsequent to the PUSCH that is dropped or stopped in the group of PUSCHs for repetition transmission use the preset RV.

2. The transmission method for a physical uplink shared channel according to claim 1, wherein, that the PUSCH is dropped or stopped comprises at least one of following:
   in response to the PUSCH overlapping with a physical uplink control channel (PUCCH) carrying a first type of uplink control information (UCI), the PUSCH is dropped or stopped;
   in response to the PUSCH overlapping with a PUCCH, and a priority or importance of the PUCCH is being higher than a priority or importance of the PUSCH, the PUSCH is dropped or stopped; or
   when in response to the PUSCH overlapping with a PUCCH with repetition transmission, the PUSCH is dropped or stopped.

3. The transmission method for a physical uplink shared channel according to claim 2, wherein the first type of UCI is a scheduling request (SR) or UCI corresponding to a first type of service or an SR corresponding to the first type of service;
   wherein the first type of service is: a service with high priority or importance, or an ultra-reliable and low-latency communication (URLLC) service;
   and/or,
   wherein the PUSCH for repetition transmission corresponds to a second type of service; wherein the second type of service is: a service with low priority or importance, or an enhanced mobile broadband (eMBB) service, or a non-URLLC service;
   and/or,
   wherein that the priority or importance of the PUCCH is higher than the priority or importance of the PUSCH comprises:
   a priority or importance of a service type corresponding to the PUCCH is higher than a priority or importance of a service type corresponding to the PUSCH.

4. The transmission method for a physical uplink shared channel according to claim 1, wherein the preset RV is a self-decoding RV;
   and/or,
   wherein the group of PUSCHs for repetition transmission are a plurality of PUSCHs carrying repetition transmission of a same transport block (TB).

5. A transmission method for a physical uplink shared channel, performed by a network device, comprising:
   in response to a determination that a physical uplink shared channel (PUSCH) using a preset redundant version (RV) in a group of PUSCHs for repetition transmission is dropped or stopped, determining, based on the preset RV, an RV of at least one PUSCH subsequent to the PUSCH that is dropped or stopped in the group of PUSCHs for repetition transmission;
   receiving a corresponding PUSCH according to the determined RV;
   wherein the determining, based on the preset RV, the RV of the at least one PUSCH subsequent to the PUSCH that is dropped or stopped in the group of PUSCHs for repetition transmission comprises:
   determining that a first PUSCH subsequent to the PUSCH that is dropped or stopped in the group of PUSCHs for repetition transmission uses the preset RV, and not changing an RV of a PUSCH subsequent to the first PUSCH subsequent to the PUSCH that is dropped or stopped in the group of PUSCHs for repetition transmission;
   or,
   determining that a first PUSCH subsequent to the PUSCH that is dropped or stopped in the group of PUSCHs for repetition transmission uses the preset RV, and determining that a PUSCH, subsequent to the first PUSCH subsequent to the PUSCH that is dropped or stopped, in the group of PUSCHs for repetition transmission uses an RV that is in a predetermined RV sequence and is selected sequentially from a position of the preset RV in the predetermined RV sequence;
   or,
   determining that all PUSCHs subsequent to the PUSCH that is dropped or stopped in the group of PUSCHs for repetition transmission use the preset RV.

6. The transmission method for a physical uplink shared channel according to claim 5, wherein, that the PUSCH is dropped or stopped comprises at least one of following:
   in response to the PUSCH overlaps overlapping with a physical uplink control channel (PUCCH) carrying a first type of uplink control information (UCI), the PUSCH is dropped or stopped;

in response to the PUSCH overlaps overlapping with a PUCCH, and a priority or importance of the PUCCH being higher than a priority or importance of the PUSCH, the PUSCH is dropped or stopped; or in response to the PUSCH overlaps overlapping with a PUCCH for with repetition transmission, the PUSCH is dropped or stopped.

7. The transmission method for a physical uplink shared channel according to claim 6, wherein the first type of UCI is a scheduling request (SR) or UCI corresponding to a first type of service or an SR corresponding to the first type of service;

wherein the first type of service is: a service with high priority or importance, or an ultra-reliable and low-latency communication (URLLC) service;

and/or, wherein the PUSCH for repetition transmission corresponds to a second type of service;

wherein the second type of service is: a service with low priority or importance, or an enhanced mobile broadband (eMBB) service, or a non-URLLC service;

and/or, wherein that the priority or importance of the PUCCH is higher than the priority or importance of the PUSCH comprises:

a priority or importance of a service type corresponding to the PUCCH is higher than a priority or importance of a service type corresponding to the PUSCH.

8. The transmission method for a physical uplink shared channel according to claim 5, wherein the preset RV is a self-decoding RV;

and/or, wherein the group of PUSCHs for repetition transmission are a plurality of PUSCHs carrying repetition transmission of a same transport block (TB).

9. A network device, comprising: a processor, a transceiver, and a memory, wherein the memory stores a program executable by the processor, and the processor is configured to execute the program to implement the steps of the method according to claim 5.

10. The network device according to claim 9, wherein, that the at least one-PUSCH is dropped or stopped comprises at least one of following:

in response to the PUSCH overlaps overlapping with a physical uplink control channel (PUCCH) carrying a first type of uplink control information (UCI), the PUSCH is dropped or stopped;

in response to the PUSCH overlaps overlapping with a PUCCH, and a priority or importance of the PUCCH is being higher than a priority or importance of the PUSCH, the PUSCH is dropped or stopped; or in response to the PUSCH overlapping with a PUCCH with repetition transmission, the PUSCH is dropped or stopped.

11. The network device according to claim 10, wherein the first type of UCI is a scheduling request (SR) or UCI corresponding to a first type of service or an SR corresponding to the first type of service;

wherein the first type of service is: a service with high priority or importance, or an ultra-reliable and low-latency communication (URLLC) service;

and/or, wherein the PUSCH for repetition transmission corresponds to a second type of service;

wherein the second type of service is: a service with low priority or importance, or an enhanced mobile broadband (eMBB) service, or a non-URLLC service;

and/or, wherein that the priority or importance of the PUCCH is higher than the priority or importance of the PUSCH comprises:

a priority or importance of a service type corresponding to the PUCCH is higher than a priority or importance of a service type corresponding to the PUSCH.

12. The network device according to claim 9, wherein the preset RV is a self-decoding RV;

and/or, wherein the group of PUSCHs for repetition transmission are a plurality of PUSCHs carrying repetition transmission of a same transport block (TB).

13. A terminal, comprising: a processor, a transceiver, and a memory, wherein the memory stores a program executable by the processor, and the processor is configured to execute the program to implement following step:

in response to a physical uplink shared channel (PUSCH) using a preset redundant version (RV) in a group of PUSCHs for repetition transmission is-being dropped or stopped, determining, based on the preset RV, an RV of at least one PUSCH subsequent to the PUSCH that is dropped or stopped in the group of PUSCHs for repetition transmission;

the transceiver is configured to send a corresponding PUSCH according to the determined RV;

wherein the processor is specifically configured to execute the program to implement following steps:

determining that a first PUSCH subsequent to the PUSCH that is dropped or stopped in the group of PUSCHs for repetition transmission uses the preset RV, and not changing an RV of a PUSCH subsequent to the first PUSCH subsequent to the PUSCH that is dropped or stopped in the group of PUSCHs for repetition transmission;

or, determining that a first PUSCH subsequent to the PUSCH that is dropped or stopped in the group of PUSCHs for repetition transmission uses the preset RV, and determining that a PUSCH, subsequent to the first PUSCH subsequent to the PUSCH that is dropped or stopped, in the group of PUSCHs for repetition transmission uses an RV that is in a predetermined RV sequence and is selected sequentially from a position of the preset RV in the predetermined RV sequence;

or, determining that all PUSCHs subsequent to the PUSCH that is dropped or stopped in the group of PUSCHs for repetition transmission use the preset RV.

14. The terminal according to claim 13, wherein, that the PUSCH is dropped or stopped comprises at least one of following:

in response to the PUSCH overlaps overlapping with a physical uplink control channel (PUCCH) carrying a first type of uplink control information (UCI), the PUSCH is dropped or stopped;

in response to the PUSCH overlaps overlapping with a PUCCH, and a priority or importance of the PUCCH is being higher than a priority or importance of the PUSCH for repetition transmission, the PUSCH is dropped or stopped; or in response to the PUSCH overlaps overlapping with a PUCCH for with repetition transmission, the PUSCH is dropped or stopped.

15. The terminal according to claim 14, wherein the first type of UCI is a scheduling request (SR) or UCI corresponding to a first type of service or an SR corresponding to the first type of service;
- wherein the first type of service is: a service with high priority or importance, or an ultra-reliable and low-latency communication (URLLC) service;

and/or,
- wherein the PUSCH for repetition transmission corresponds to a second type of service;
- wherein the second type of service is: a service with low priority or importance, or an enhanced mobile broadband (eMBB) service, or a non-URLLC service;

and/or,
- wherein that the priority or importance of the PUCCH is higher than the priority or importance of the PUSCH comprises:
- a priority or importance of a service type corresponding to the PUCCH is higher than a priority or importance of a service type corresponding to the PUSCH.

16. The terminal according to claim 13, wherein the preset RV is a self-decoding RV;
and/or,
- wherein the group of PUSCHs for repetition transmission are a plurality of PUSCHs carrying repetition transmission of a same transport block (TB).

* * * * *